Figure 3:
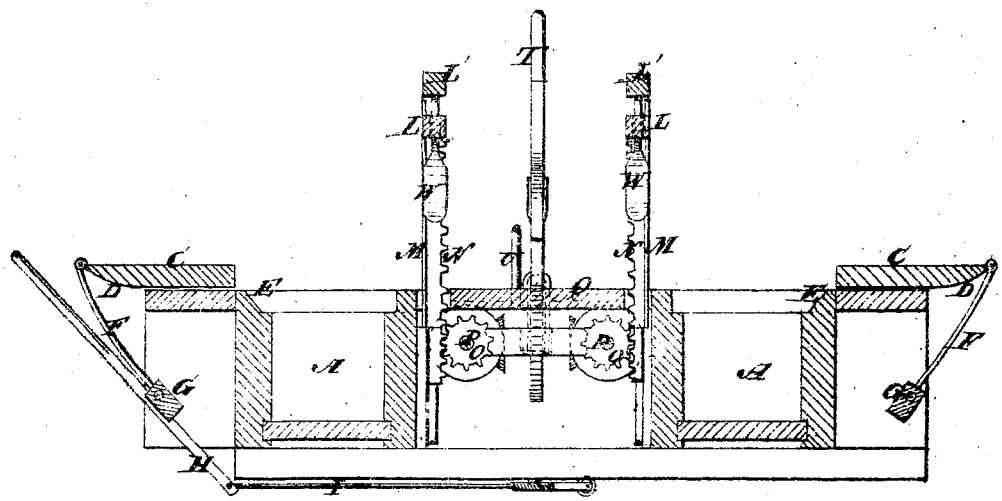

O. P. Weston. Carriage Washing Machine.
118085 — Fig. 1 — Patented Aug 15 1871
2 Sheets — Sheet 1.
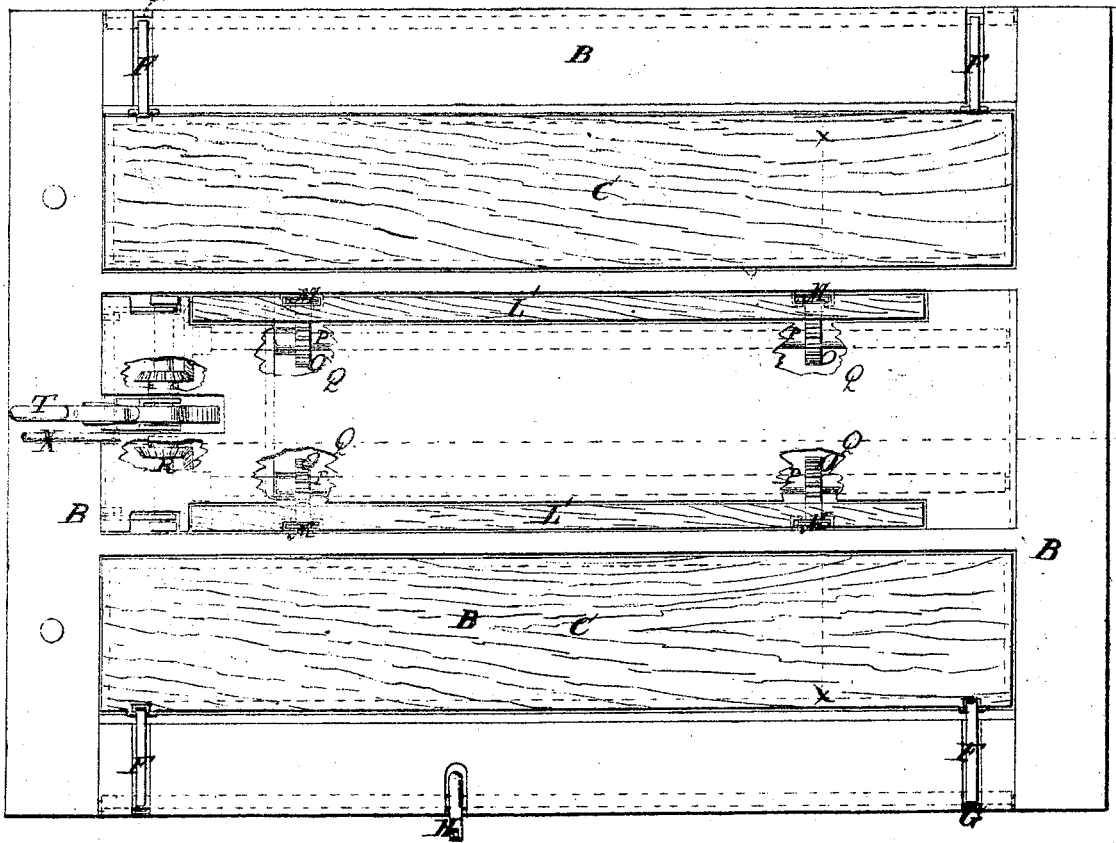
Fig. 2.
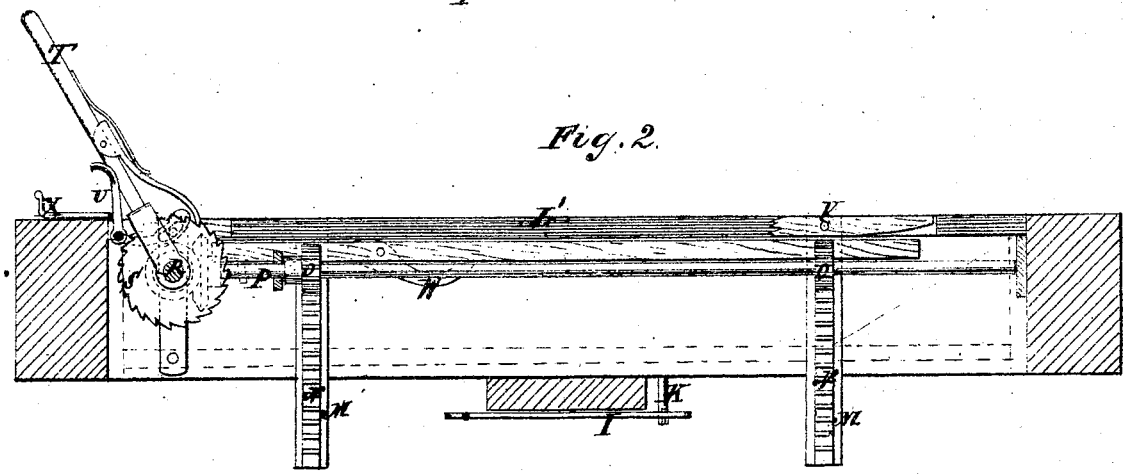
Witnesses:
E. Wolff
Francis McArdle
Inventor:
O. P. Weston
per Munn & Co.
Attorneys.

2 Sheets
Sheet 2.

O. P. Weston. Carriage Washing Machine.
118085

Witnesses:
E. Wolff
Francis McArdle

Inventor:
O. P. Weston
per
Attorneys.

UNITED STATES PATENT OFFICE.

OLIVER P. WESTON, OF SHATTUCKVILLE, MASSACHUSETTS.

IMPROVEMENT IN CARRIAGE-WASHING MACHINES.

Specification forming part of Letters Patent No. 118,085, dated August 15, 1871.

*To all whom it may concern:*

Be it known that I, OLIVER P. WESTON, of Shattuckville, in the county of Franklin and State of Massachusetts, have invented a new and Improved Carriage-Washing Machine; and I do hereby declare that the following is a full, clear, and exact description thereof, which will enable others skilled in the art to make and use the same, reference being had to the accompanying drawing forming part of this specification.

This invention relates to improvements in apparatus for washing carriages; and it consists in a combination of a pair of washing-boxes and a lifting-jack adapted for running the carriage into the boxes, the covers being withdrawn, and letting the wheels down into the water in the boxes, but supporting them above the bottom to allow them to be turned freely on the axles for washing, by which the water applied for washing them and the body of the carriage will be received as it falls into said boxes to be used as long as required, whereby a great economy of water and labor is effected.

Figure 1 is a plan view of the improved machine. Fig. 2 is a longitudinal section on the line $x\ x$ of Fig. 1, and Fig. 3 is a transverse section on the line $x\ x$ of Fig. 1.

Similar letters of reference indicate corresponding parts.

A represents a pair of narrow boxes, long enough to receive the wheels of a wagon, the two of one side in each; said boxes being connected together in any suitable frame, B, and being as deep as may be required for the purpose. They have covers C arranged to slide off and on in the transverse direction, being curved on the outer edges D to rise and fall in passing over the beveled edges E of the boxes. They are connected by arms F to the oscillating shafts G, which are connected together by a system of levers, H, I, K, and C, so that by properly moving the lever H, which is extended upward to form a handle for the purpose, the two covers may be readily moved on and off the box simultaneously. L represents the horizontal bars, and M the vertical bars of a lifting-jack arranged between the boxes, the bars L being parallel therewith to raise and lower the carriage. The vertical bars have toothed bars N upon them, gearing with the pinions O on shafts P, arranged between the boxes under the permanent cover Q, and gearing at one end with the short shaft R, which is provided with a ratchet-wheel, S, a pawl-lever, T, and a holding-pawl, U. The bars L are provided with an upper bar, L′, pivoted to one of the vertical bars M, as at V, and have a cam-dog, W, fixed near the other end to raise said bars L′ higher at one end than the other for raising the hind and higher part of the wagons as much as the front. The said cam-dogs will hold the said bars L′ up when turned on their pivots to a vertical position. The vertical bars M are provided with flanges and suitable guides for controlling them in rising and falling.

The carriage to be washed is rolled into the box, raised off the bottom by the jack, and held by ratchet-wheel S and the pawl-lever, the covers being removed by the lever H and the others connected to it; then the carriage is washed and rolled away. In letting the carriage down the holding-pawl is raised out of the wheel and held while the wheel is moving back (being turned by the weight of the carriage) and dropped in the wheel again when the pawl-lever T is moved forward for a new hold. The holding-pawl is provided with a locking-dog, $x$, to hold it against being inadvertently tripped and letting the carriage fall.

It will be readily seen that by this apparatus the labor of washing carriages will be simplified and cheapened considerably.

Having thus described my invention, I claim as new and desire to secure by Letters Patent—

1. The combination of the washing-boxes and the lifting-jack, substantially as specified.
2. The combination, with the boxes and jack, of the sliding covers and a system of levers for working them simultaneously, substantially as specified.

OLIVER P. WESTON.

Witnesses:
DAVID L. SMITH,
HEZEKIAH SMITH.